United States Patent [19]

Yook

[11] Patent Number: 4,829,414
[45] Date of Patent: May 9, 1989

[54] CIRCUIT FOR GENERATING A CONSTANT HIGH VOLTAGE FOR CRT DEFLECTION IN RESPONSE TO MULTI-FREQUENCY HORIZONTAL SYNC INPUT SIGNAL

[75] Inventor: Keun J. Yook, Kyeongsangbook, Rep. of Korea

[73] Assignee: Goldstar Co., Ltd., Seoul, Rep. of Korea

[21] Appl. No.: 125,368

[22] Filed: Nov. 25, 1987

[30] Foreign Application Priority Data

Nov. 29, 1986 [KR] Rep. of Korea ............... 10167/1986

[51] Int. Cl.[4] ..................... H02M 3/335; H01J 27/70
[52] U.S. Cl. ..................................... 363/20; 315/408; 315/411; 358/190
[58] Field of Search .................. 363/20; 315/411, 408; 358/190, 243; 323/349

[56] References Cited

U.S. PATENT DOCUMENTS

| | | | |
|---|---|---|---|
| 3,393,336 | 7/1983 | Schmidt | 315/411 |
| 3,745,246 | 7/1973 | Kashiwagi | 315/411 |
| 4,574,224 | 3/1986 | Nowaczyk | 315/408 |
| 4,649,465 | 3/1987 | Kitou et al. | 363/21 |
| 4,673,984 | 6/1987 | Kikuchi et al. | 358/190 |
| 4,679,211 | 7/1987 | Kurz | 358/190 |
| 4,740,877 | 4/1988 | Wharton | 363/21 |
| 4,774,439 | 9/1988 | Butterfield et al. | 315/408 |

FOREIGN PATENT DOCUMENTS 140771  11/1981  Japan ................... 358/190

Primary Examiner—William H. Beha, Jr.
Attorney, Agent, or Firm—Birch, Stewart, Kolasch & Birch

[57] ABSTRACT

A circuit for generating a constant DC high voltage responsive to an input signal having various frequencies, having a frequency-voltage converter responsive to the input signal to generate a voltage signal corresponding to the frequency of the input signal. The voltage signal is applied to an oscillation circuit and a voltage control circuit, respectively, as a control signal. The output from the oscillation circuit is coupled to one terminal of a primary coil of a flyback transformer (FBT), and the output from the voltage control circuit is coupled to the other terminal of the primary coil of the flyback transformer (FBT).

5 Claims, 2 Drawing Sheets (A)

(B)

CIRCUIT FOR GENERATING A CONSTANT HIGH VOLTAGE FOR CRT DEFLECTION IN RESPONSE TO MULTI-FREQUENCY HORIZONTAL SYNC INPUT SIGNAL

BACKGROUND OF THE INVENTION

The present invention relates to a horizontal frequency signal driving circuit for a CRT apparatus and more particularly to a multi-horizontal frequency signal driving circuit which can drive a flyback transformer for generating a stabilized high voltage in response to a signal having various frequencies.

In a conventional horizontal frequency signal driving circuit, a relay or an analog switch has been optionally used in the input stage of the circuit for selectively processing the various frequencies. Now, assume that the next stage of the circuit is a conventional horizontal deflection circuit. Then, the following problem arises. As is well known, in a conventional horizontal deflection circuit, an input signal, i.e., a horizontal synchronization signal is processed through a horizontal oscillation circuit, a horizontal driving circuit and a horizontal output circuit, and the resultant voltage signal is supplied to one terminal of the primary coil of a flyback transformer (FBT) for generating a high voltage which will be supplied to an anode of a CRT. Connected to the other terminal of the primary coil of the FBT is a DC voltage power supply. In the case where the frequency of the input signal is changed, the oscillating frequency of the horizontal oscillation circuit and, hence, the supply voltage to the FBT are also changed to stabilize the high voltage output from the FBT. In this case, however, since the change of the frequency of the input signal is performed by a switching operation of a relay or an analog switch, the oscillating frequency and, hence, the supply voltage to the FBT may be unstabilized at the time of the switching point. Thus, at this point, the high voltage output from the FBT may be raised or lowered from a predetermined level. This has an adverse effect on the CRT display.

SUMMARY OF THE INVENTION

An object of the present invention is to provide a multihorizontal frequency signal driving circuit which can drive a flyback transformer for generating a stabilized high voltage in response to an input signal having various frequencies.

Another object of the present invention is to provide a multi-horizontal frequency signal driving circuit which enables an oscillating frequency and a supply voltage to a flyback transformer to vary linearly with the frequency of a multi-frequency signal.

The objects mentioned above are achieved in a preferred embodiment of the present invention comprising a frequency to voltage converter means which responds to a multi-frequency signal to generate a voltage signal as a control signal. The voltage level of the control signal is proportional to the frequency of the input signal. The control signal is applied to an oscillator means for controlling an oscillating frequency. At the same time, the control signal is applied to a voltage controller means for controlling its output voltage level.

BRIEF DESCRIPTION OF THE DRAWINGS

The above and other objects and features of the present invention will become more apparent from the following detailed description taken in conjunction with the accompanying drawings wherein.

DETAILED DESCRIPTION OF THE INVENTION

Figure 1:
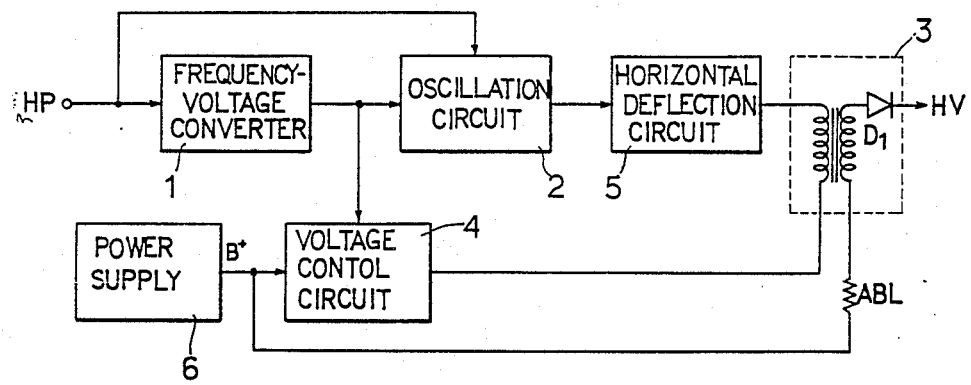
FIG. 1 is a block diagram of a preferred embodiment of the present invention.
Figure 2:
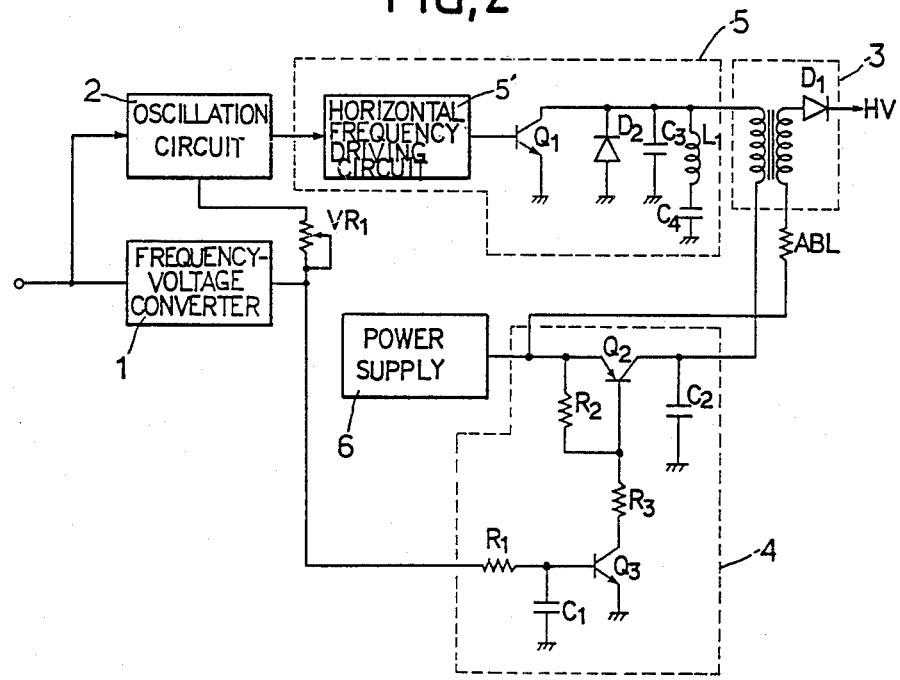
FIG. 2 is a more detailed circuit diagram of FIG. 1.

Referring now to FIGS. 1 and 2, an input terminal HP to which a multi-frequency signal is applied is coupled directly to an oscillation circuit 2 such as a conventional horizontal oscillation circuit in a conventional horizontal deflection circuit. The input terminal HP is also coupled to a control input of the oscillation circuit 2 via a frequency-voltage converter 1 including a conventional frequency discriminator. A variable resistor $VR_1$ for adjusting the level of the control signal is coupled between an output of the frequency-voltage converter 1 and a control input of the oscillation circuit 2.

The output from the oscillation circuit 2 is applied to a base of a horizontal output transistor $Q_1$ through a horizontal frequency driving circuit 5' in a conventional horizontal deflection circuit 5. Between a collector and an emitter of the transistor $Q_1$, a damper diode $D_2$, a resonance capacitor $C_3$ and a deflecting coil $L_1$ are connected in parallel with each other. A capacitor $C_4$, which is connected to the deflecting coil $L_1$ and is intended to compensate for a so-called S characteristic, operates as an effective power source for supplying a saw-toothed deflection current to the deflecting coil $L_1$. During the blanking periods, a voltage induced at the top terminal of the deflecting coil $L_1$ is supplied to one terminal of a primary coil of a flyback transformer FBT in a high voltage generating circuit 3, as a flyback pulse.

On the other hand, the output from the frequency-voltage converter 1 is also applied to a control input of a voltage control circuit 4 which consists of transistors $Q_2$ and $Q_3$, resistors $R_1$ through $R_3$ and capacitors $C_1$ and $C_2$. A DC voltage from power supply 6 is applied to The output from the voltage control circuit 4 is supplied to the other terminal of the primary coil of the flyback transformer FBT. One terminal of the secondary coil of the flyback transformer FBT is coupled to the voltage input of the voltage control circuit 4 via a resistor ABL which is used for automatic brightness limiting. The other terminal of the secondary coil of the flyback transformer FBT is coupled to a high voltage output terminal HV via a diode $D_1$.

In the circuit of FIG. 2 constructed as mentioned above, when a multi-horizontal frequency signal is applied to the frequency-voltage converter 1, it is converted to a voltage signal of which level is proportional to the frequency of the horizontal signal. Specifically, referring to FIG. 3(A), when the frequency fi of the input signal increases gradually, the output voltage Vo from the frequency-voltage converter 1 is correspondingly increased.

Figure 3:
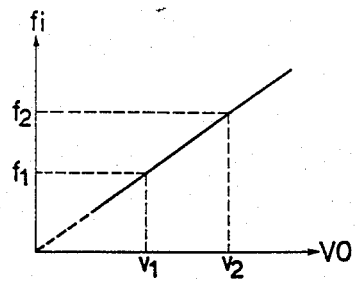
FIGS. 3(A) and (B) and 4(A) through (E) are views showing waveforms used to explain the operation of the circuit of FIG. 2.
Figure 3:
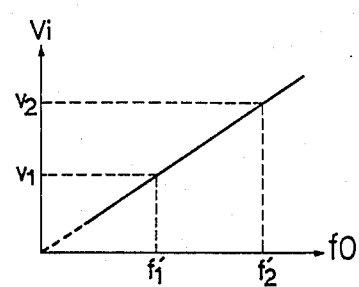

The output voltage Vo from the frequency-voltage converter 1 is supplied to the control input of the oscillation circuit 2 as a control voltage Vi. Referring to FIG. 3(B), when the control voltage $V_i$ increases gradually, the oscillating frequency fo of the oscillation circuit 2 is correspondingly increased.

Figure 4:
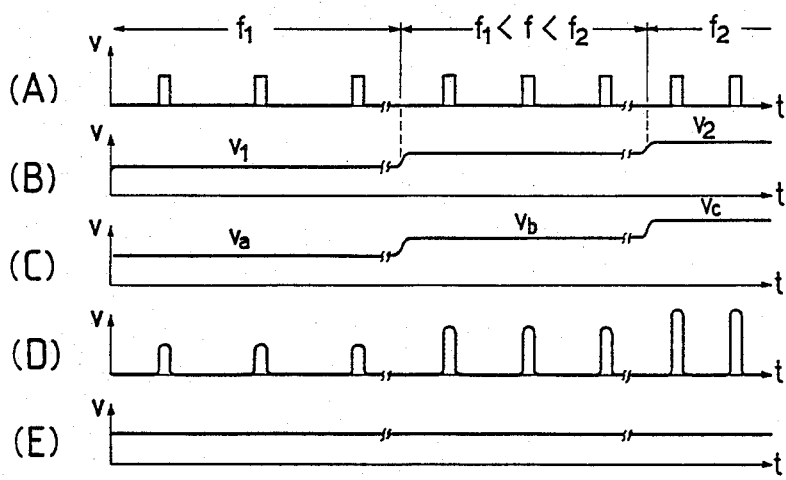

When the multi-frequency signal as shown in FIG. 4(A) is applied at terminal HPA, voltage signal having waveforms as shown in FIG. 4(B) is generated from the frequency-voltage converter 1 and is applied to the control input of the oscillation circuit 2 as a control signal via a variable resistor $VR_1$. Therefore, the oscillated signal, i.e., the output signal from the oscillation circuit 2 is precisely tuned with the input multi-frequency signal.

The oscillated signal from the oscillation circuit 2 is applied to the base of the horizontal output transistor $Q_1$ through a conventional horizontal frequency driving circuit 5'. the voltage signal having pulse waveforms as shown in FIG. 4(D) is then generated at the collector of the transistor $Q_1$, and is supplied to the primary coil of the flyback transformer FBT. Correspondingly, a high voltage is induced at the secondary coil of the flyback transformer FBT, and is rectified by a diode $D_1$ to form a CRT anode voltage.

Further, the voltage signal derived from the frequencyvoltage converter 1 is applied to the base of a transistor $Q_3$ via a resistor $R_1$ and a capacitor $C_1$ in the voltage control circuit 4. Then, the voltage signal having waveforms as shown in FIG. 4(C) is generated from the collector of the transistor $Q_3$. Specifically, when the frequency of the input multi-frequency signal is $fi=f_1$, the output voltage from the frequency-voltage converter 1 is $Vo=V_1$. When this voltage $V_1$ is applied to the base of the transistor $Q_3$ via the resistor $R_1$, a bias current which is proportional to the voltage $V_1$ is applied to the base transistor $Q_2$, with the constant voltage Va as shown in FIG. 4(C) being generated from the collector of the transistor $Q_2$. Similarly, when the frequency fi of the multi-frequency signal increases to $f_2$, the output voltage Vo from the frequency-voltage converter 1 correspondingly increases to $V_2$. This voltage $V_2$ is applied to the base of the transistor $Q_3$ via resistor $R_1$, and hence a bias current which is proportional to the voltage $V_2$ is applied to the base of the transistor $Q_2$. The constant voltage $V_e$ as shown in FIG. 4(C) is generated from the collector of the transistor $Q_2$.

As explained above, when the frequency fi of the input multi-frequency signal increases from $f_1$ to $f_2$, the output voltage Vo from the frequency-voltage converter 1 is correspondingly increased from $V_1$ to $V_2$. At this time, since the collector current of the transistor $Q_3$ is correspondingly increased to increase the conduction rate of the transistor $Q_2$, the output voltage generated from the collector of the transistor $Q_2$ is raised from Va to Vc as shown in FIG. 4(C). This output voltage from the voltage control circuit 4 is supplied to the other terminal of the primary coil of the flyback transformer FBT as a source voltage.

Since the source voltage being supplied to the flyback transformer FBT is linearly varied from Va to Vc by changing the frequency of the multi-frequency signal from $f_1$ to $f_2$, the peak voltage of the flyback pulse, i.e., the voltage induced at the top of the deflecting coil $L_1$, which is then supplied to one terminal of the primary coil of the flyback transformer FBT, is raised to compensate for the reduction of the high voltage. Therefore, the high voltage obtained from the secondary coil of the flyback transformer is constantly maintained at a predetermined level as shown in FIG. 4(E), even when the input signal has various frequencies.

As can be understood from the above description, even when an input signal has various frequencies, a stabilized high voltage can be obtained from a flyback transformer since the oscillating frequency and source voltage to the flyback transformer are linearly varied with the frequency. Although only one embodiment of the invention has been disclosed and described, it is apparent that other embodiments and modifications of the present invention are possible.

What is claimed is:

1. A circuit for providing a stabilized high voltage at an output of a flyback transformer in a cathode ray tube (CRT) apparatus in response to a multi-frequency horizontal sync signal, comprising:

frequency-to-voltage converter means responsive to said multi-frequency signal for generating a voltage signal having an amplitude corresponding to the frequency of said multi-frequency signal;

oscillator means responsive to said voltage signal and said multi-frequency signal for generating an oscillation signal corresponding to the amplitude of said voltage signal and the frequency of said multi-frequency signal;

means for applying said oscillation signal to one terminal of a primary coil of said flyback transformer; and voltage control means responsive to said voltage signal for generating a source voltage signal proportional to said voltage signal and applying said source voltage signal to another terminal of said primary coil of said flyback transformer, the voltage produced across said primary coil inducing a stabilized high voltage at an output terminal of a secondary coil of said flyback transformer.

2. A circuit as defined in claim 1, wherein said voltage control means comprises a first transistor coupled to receive said voltage signal and responsive thereto for developing a control signal input to a second transistor; said second transistor responsive to said control signal for outputting said source voltage signal.

3. A circuit as defined in claim 2, wherein said first and second transistors are bipolar transistors, said voltage signal is coupled to a base of said first transistor, said control signal is developed at a collector of said first transistor and coupled to a base of said second transistor, an emitter of said second transistor is coupled to a power supply, and said source voltage signal is developed at a collector of said second transistor.

4. A circuit as defined in claim 1, further comprising a variable resistor coupling said voltage signal from said converter means to said oscillator means.

5. A circuit as defined in claim 1, wherein said means for applying comprises a transistor coupled to said one terminal of said primary coil, and a diode, a capacitor and a deflecting coil connected in parallel with said transistor.

* * * * *